(12) United States Patent
Satou

(10) Patent No.: US 8,796,387 B2
(45) Date of Patent: *Aug. 5, 2014

(54) RUBBER COMPOSITION

(75) Inventor: Yoshitaka Satou, Higashiyamoto (JP)

(73) Assignee: Bridgestone Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/059,268

(22) PCT Filed: Aug. 17, 2009

(86) PCT No.: PCT/JP2009/064405
§ 371 (c)(1),
(2), (4) Date: Mar. 11, 2011

(87) PCT Pub. No.: WO2010/021310
PCT Pub. Date: Feb. 25, 2010

(65) Prior Publication Data
US 2011/0184109 A1    Jul. 28, 2011

(30) Foreign Application Priority Data

Aug. 19, 2008 (JP) ................. 2008-210861
Jun. 30, 2009 (JP) ................. 2009-156093

(51) Int. Cl.
*C08K 3/06* (2006.01)
*C08K 5/098* (2006.01)
*C08K 5/47* (2006.01)
*C08K 5/3415* (2006.01)
*C08K 5/3417* (2006.01)
*C08K 5/44* (2006.01)

(52) U.S. Cl.
USPC ......... 525/332.7; 525/349; 525/375; 525/370

(58) Field of Classification Search
USPC ............. 525/332.7, 349, 370, 375
See application file for complete search history.

(56) References Cited

U.S. PATENT DOCUMENTS

| | | | |
|---|---|---|---|
| 3,658,828 A | 4/1972 | D'Amico | |
| 4,960,833 A * | 10/1990 | Nagasaki et al. | 525/329.3 |
| 5,109,055 A * | 4/1992 | Nagasaki et al. | 524/571 |
| 5,939,493 A * | 8/1999 | Hojo | 525/332.6 |
| 6,814,116 B2 * | 11/2004 | Uchino et al. | 152/451 |
| 8,530,549 B2 * | 9/2013 | Tanimoto | 524/84 |
| 8,609,252 B2 * | 12/2013 | Satou | 428/462 |
| 2008/0026244 A1 | 1/2008 | Barbotin et al. | |
| 2008/0300368 A1 * | 12/2008 | Miyazaki | 525/349 |
| 2010/0324301 A1 * | 12/2010 | Akimoto et al. | 548/168 |

FOREIGN PATENT DOCUMENTS

| | | |
|---|---|---|
| EP | 0345825 A1 | 12/1989 |
| EP | 0564966 A2 | 10/1993 |
| EP | 0751178 A1 | 1/1997 |
| EP | 0775726 A1 | 5/1997 |
| EP | 1205315 A2 | 5/2002 |
| EP | 1674292 A1 | 6/2006 |
| JP | 48-11214 B1 | 4/1973 |
| JP | 61-85454 A | 5/1986 |
| JP | 10-251449 A | 9/1998 |
| JP | 2004-051796 A | 2/2004 |
| JP | 2004-189146 A | 7/2004 |
| JP | 2005-139082 A | 6/2005 |
| JP | 2005-139239 A | 6/2005 |
| JP | 2007-063245 A | 3/2007 |
| JP | 2007-535598 A | 12/2007 |
| JP | 2009-7549 A | 1/2009 |
| WO | 2009/072382 A1 | 6/2009 |
| WO | 2009/072560 A1 | 6/2009 |

(Continued)

OTHER PUBLICATIONS

C.-D. Wacker et al., "New Sulfenamide Accelerators Derived from 'Safe' Amines for the Rubber and Tyre Industry", IARC Scientific publications, Lyon, vol. 105, Jan. 1, 1991, pp. 592-594.*

(Continued)

*Primary Examiner* — Roberto Rabago
(74) *Attorney, Agent, or Firm* — Sughrue Mion, PLLC

(57) ABSTRACT

It is to provide a high-elasticity rubber composition having a good workability while preventing the deterioration of rubber properties and capable of reducing rubber burning as far as possible by using a vulcanization accelerator having a retarding effect equal to or more than that of DCBS without using a retarder such as CTP possibly causing the deterioration of rubber properties after the vulcanization and problems such as blooming and the like and capable of realizing a higher elasticity and excellent low heat-buildup. The rubber composition according to the invention is characterized by comprising a rubber component, a sulfenamide-based vulcanization accelerator represented by a formula (I), a bismaleimide derivative represented by a formula (II) and sulfur.

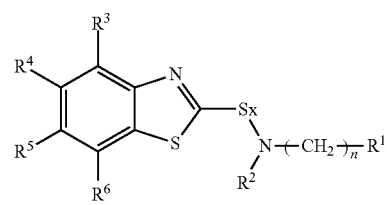

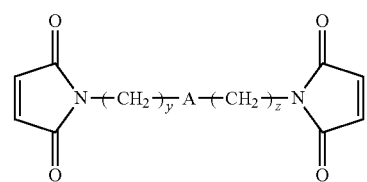

10 Claims, No Drawings

(56) References Cited

FOREIGN PATENT DOCUMENTS

| WO | 2009/084538 A1 | | 7/2009 |
|---|---|---|---|
| WO | 2009/084617 A1 | | 7/2009 |
| WO | WO 2009/084538 A1 | * | 7/2009 |

OTHER PUBLICATIONS

Chinese Office Action corresponding to CN 200980139884, dated Jun. 5, 2012.

Chinese Office Action for corresponding Application No. 200980139884.6, dated Dec. 5, 2012.

Extended European Search Report issued Mar. 15, 2012, in European Patent Application No. 09808246.4.

Japanese Office Action for Application No. 2009-156093 issued Dec. 24, 2013.

Communication, dated May 28, 2014, issued by the State Intellectual Property Office of the People's Republic of China, in counterpart Application No. 200980139884.6.

* cited by examiner

RUBBER COMPOSITION

CROSS REFERENCE TO RELATED APPLICATION

This application is a National Stage of International Application No. PCT/JP2009/064405 filed Aug. 17, 2009, claiming priority based on Japanese Patent Application Nos. 2008-210861, filed Aug. 19, 2008 and 2009-156093, filed Jun. 30, 2009, the contents of all of which are incorporated herein by reference in their entirety.

TECHNICAL FIELD

This invention relates to a rubber composition containing a specified sulfenamide-based vulcanization accelerator, and more particularly to a rubber composition which can be preferably used in a base rubber or a belt rubber of a tread portion of a tire for passenger car, truck, bus, motorcycle or the like.

RELATED ART

In rubber articles such as tires for automotives, conveyor belt, hoses and the like, it is desired to have various high properties in addition to the strength until now. Particularly, in case of using in a base rubber or belt rubber of the tire, there is used a method of adding a bismaleimide derivative to a rubber composition for the purpose of attaining a high elasticity and a low heat-buildup so as to impart a high steering stability.

For example, Patent Document 1 discloses a rubber composition compounded with a particular bismaleimide derivative for solving various problems inherent to the conventional bismaleimide derivative. In this way, it is possible to give a high elasticity and a low heat-buildup to the rubber composition.

On the other hand, there are frequently used composite materials formed by covering a metal reinforcement such as steel cords or the like with a rubber composition to reinforce rubber for improving the strength and durability. If it is intended to adhere the metal to rubber, there is known a method of simultaneously conducting the bonding between rubber and metal, i.e. a direct vulcanization adhesion method. In this case, it is useful to use a sulfenamide-based vulcanization accelerator giving a delayed effectiveness to vulcanization reaction for simultaneously conducting the vulcanization of rubber and the binding between rubber and metal. For example, among commercially available sulfenamide-based vulcanization accelerators, N,N'-dicyclohexyl-2-benzothiazolyl sulfenamide (hereinafter abbreviated as "DCBS") is currently known as a vulcanization accelerator most giving a delayed effectiveness to vulcanization reaction. When the delayed effectiveness is further required, the sulfenamide-based vulcanization accelerator is used together with a retarder such as N-(cyclohexylthio)phthalimide (hereinafter abbreviated as "CTP").

PRIOR ART DOCUMENT

Patent Document

[Patent Document 1] JP-A-2004-51796

SUMMARY OF THE INVENTION

Problems to be Solved by the Invention

However, there is still a room to be improved. For example, when the bismaleimide derivative as mentioned above is compounded together with the conventional vulcanization accelerator, there is a tendency that good milling operation can not be attained because Mooney viscosity is excessively raised and hence it is considered that it is difficult to ensure a favorable Mooney scorch time simultaneously. Also, when the conventional vulcanization accelerator is used together with the retarder as mentioned above, it badly affects the physical properties of the vulcanized rubber depending on the amount of the retarder compounded, and results in problem causing the deterioration of the appearance in the vulcanized rubber and the blooming badly exerting on the adhesiveness.

It is, therefore, an object of the invention to provide a rubber composition having a good workability while preventing the deterioration of rubber properties and capable of reducing rubber burning as far as possible by using a vulcanization accelerator having a retarding effect equal to or more than that of DCBS without using a retarder such as CTP possibly causing the deterioration of rubber properties after the vulcanization and problems such as blooming and the like and capable of realizing a higher elasticity and excellent low heat-buildup.

Means for Solving Problems

The inventor has found a rubber composition which prevents the deterioration of rubber properties and is capable of giving a good workability, a high elasticity and a low heat-buildup while adopting a specified sulfenamide-based vulcanization accelerator for solving the above problems, and as a result the invention has been accomplished.

That is, the rubber composition of the invention is characterized by comprising a rubber component, a sulfenamide-based vulcanization accelerator represented by a formula (I), a bismaleimide derivative represented by a formula (II) and sulfur.

[Chemical 1]

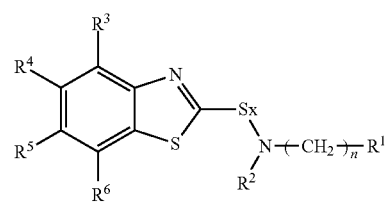

(I)

(In the formula (I), $R^1$ is a branched alkyl group having a carbon number of 3-12, $R^2$ is a straight alkyl group having a carbon number of 1-10 or a branched alkyl group having a carbon number of 3-10, $R^3$-$R^6$ are independently a hydrogen atom, a straight alkyl group or alkoxy group having a carbon number of 1-4 or a branched alkyl group or alkoxy group having a carbon number of 3-4 and may be same or different, and n is 0 or 1, and x is 1 or 2.)

[Chemical 2]

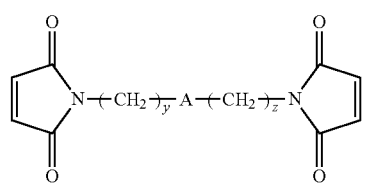

(II)

(In the formula (II), A is bivalent aromatic residue having a carbon number of 6-30 and y and z are independently an integer of 0-3.).

It is desirable that the sulfenamide-based vulcanization accelerator is included in an amount of 0.1-10 parts by mass based on 100 parts by mass of the rubber component, and also it is desirable that the bismaleimide derivative is included in an amount of 0.1-30 parts by mass.

Further, it is desirable that sulfur is included in an amount of 0.3-10 parts by mass based on 100 parts by mass of the rubber component.

In the formula (I), $R^1$ and $R^2$ are preferable to be a branched alkyl group having a branching at α-site. Also, it is preferable that $R^1$ is tert-butyl group and n is 0. Further, it is preferable that $R^1$ is tert-butyl group, $R^2$ is a straight alkyl group having a carbon number of 1-6 or a branched alkyl group having a carbon number of 3-6 and each of $R^3$-$R^6$ is a hydrogen atom. In addition, it is preferable that $R^1$ is tert-butyl group, $R^2$ is a straight alkyl group having a carbon number of 1-6 or a branched alkyl group having a carbon number of 3-6, each of $R^3$-$R^6$ is a hydrogen atom and n is 0. Furthermore, it is preferable that $R^1$ is tert-butyl group, $R^2$ is methyl group, ethyl group or n-propyl group, each of $R^3$-$R^6$ is a hydrogen atom and n is 0. Moreover, it is preferable that $R^1$ is tert-butyl group, $R^2$ is ethyl group, each of $R^3$-$R^6$ is a hydrogen atom and n is 0.

The rubber composition is preferable to further contain a cobalt-based component made of cobalt element and/or a cobalt-containing compound. The content of the cobalt-based component is desirable to be 0.03-3 parts by mass as a cobalt quantity per 100 parts by mass of the rubber component. Also, the cobalt-containing compound may be a cobalt salt of an organic acid.

Further, the rubber component may comprise at least one of natural rubber and polyisoprene rubber, and not less than 50 mass % of natural rubber may be included in 100 mass % of the rubber component.

Effect of the Invention

According to the invention, a vulcanization accelerator having a retarding effect equal to or more than that of DCBS is used, so that the rise of the Mooney viscosity is effectively suppressed to facilitate the milling operation but also an appropriate Mooney scorch time can be maintained. Also, the use of the retarder such as CTP possibly causing the deterioration of rubber properties after the vulcanization and problems such as blooming and the like is not required, so that there is no fear of badly affecting the appearance and adhesiveness of the vulcanized rubber. Therefore, there can be obtained a rubber composition which effectively prevents the deterioration of rubber properties to reduce the occurrence of rubber burning as far as possible while maintaining the good workability and has a higher elasticity and a low heat-buildup.

Therefore, the excellent steering stability can be realized by adopting the rubber composition according to the invention in a base rubber, a belt rubber or the like of a tread portion in tires for passenger car, truck, bus, motorcycle and the like.

BEST MODE FOR CARRYING OUT THE INVENTION

The invention will be concretely described below.
The rubber composition of the invention is characterized by comprising a rubber component, a sulfenamide-based vulcanization accelerator represented by the formula (I), a bismaleimide derivative represented by the formula (II) and sulfur.

[Chemical 3]

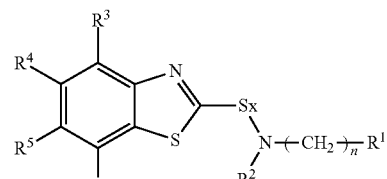

(I)

[Chemical 4]

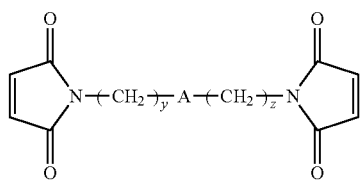

(II)

The rubber component used in the invention is not particularly limited as long as it is used in rubber articles such as tire, industrial belt and so on. The rubber component having a double bond in its main chain is crosslinkable with sulfur and effectively functions the sulfenamide-based vulcanization accelerator represented by the formula (I). For example, natural rubber or synthetic rubbers are used. As the synthetic rubber are concretely mentioned polyisoprene rubber, styrene-butadiene copolymer, polybutadiene rubber, ethylene-propylene-diene terpolymer, chloroprene rubber, halogenated butyl rubber, acrylonitrile-butadiene rubber and the like.

The rubber component is preferable to comprise at least one of natural rubber and polyisoprene rubber in view of the adhesiveness to a metal reinforcing member such as steel cord or the like. Further, it is desirable to contain not less than 50 mass % of natural rubber in 100 mass % of the rubber component from a viewpoint of the durability of industrial belt rubber. The upper limit is not particularly limited, and may be 100 mass %. Moreover, the remainder is synthetic rubber, which is desirable to contain at least one of the aforementioned synthetic rubbers.

The sulfenamide-based vulcanization accelerator of the formula (I) used in the invention has a retarding effect equal to that of the conventional sulfenamide-based vulcanization accelerator represented by the following formula (X) being DCBS, and effectively suppresses the rise of the Mooney viscosity and can ensure a favorable Mooney scorch time. Also, it is excellent in the adhesion durability during direct vulcanization adhesion to the metal reinforcing member such as steel cords or the like and can be favorably used in a rubber composition for coating a thick rubber product or the like.

[Chemical 5]

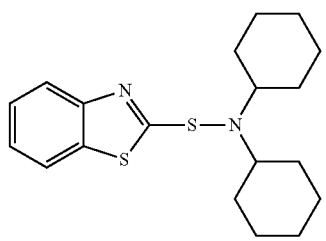

(X)

In the invention, $R^1$ in the sulfenamide-based vulcanization accelerator represented by the formula (I) is a branched alkyl group having a carbon number of 3-12. When $R^1$ is a branched alkyl group having a carbon number of 3-12, the vulcanization acceleration performance of the sulfenamide-based vulcanization accelerator is good but also the adhesion performance can be enhanced.

As $R^1$ are concretely mentioned isopropyl group, isobutyl group, triisobutyl group, sec-butyl group, tert-butyl group, isoamyl group (isopentyl group), neopentyl group, tert-amyl group (tert-pentyl group), isohexyl group, tert-hexyl group, isoheptyl group, tert-heptyl group, isooctyl group, tert-octyl group, isononyl group, tert-nonyl group, isodecyl group, tert-decyl group, isoundecyl group, tert-undecyl group, isododecyl group, tert-dodecyl group and so on. Among them, a branched alkyl group having a branching at α-site, i.e. tert-alkyl group having a carbon number of 3-12 is preferable in view of the effect for providing a suitable Mooney scorch time or the like, and particularly tert-butyl group, tert-amyl group (tert-pentyl group), tert-dodecyl group and triisobutyl group are preferable, and tert-butyl group is most preferable from a viewpoint of balancedly developing the improvement of adhesiveness and the vulcanization rate equal to that of DCBS.

In the sulfenamide-based vulcanization accelerator of the formula (I), n is 0 or 1, and is preferable to be 0 in view of the effects such as easiness of synthesis, starting material cost and the like. Also, x in the formula (I) is an integer of 1 or 2. If x is 3 or more, the reactivity is too high, and hence the stability of the sulfenamide-based vulcanization accelerator lowers and there is a fear of deteriorating the workability.

This is guessed due to the fact that the presence of a bulky group in the vicinity of —N— adjacent to $R^1$ tends to provide a good Mooney scorch time. Therefore, it is considered that the compound of the formula (I) wherein $R^1$ is tert-butyl group and n is 0 becomes more bulky in the vicinity of —N— as compared with DCBS wherein $R^1$ is cyclohexyl group and n is 0, and can give a more favorable Mooney scorch time. Further, the bulkiness of the substituent located in the vicinity of —N— is properly controlled together with $R^2$ as mentioned later, whereby the preferable vulcanization rate and the good adhesiveness can be developed balancedly while considering accumulation to a human body.

In the invention, $R^2$ in the sulfenamide-based vulcanization accelerator of the formula (I) is a straight alkyl group having a carbon number of 1-10 or a branched alkyl group having a carbon number of 3-10. When $R^2$ is a straight alkyl group having a carbon number of 1-10 or a branched alkyl group having a carbon number of 3-10, the vulcanization acceleration performance of the sulfenamide-based vulcanization accelerator is good but also the adhesion performance can be enhanced.

As $R^2$ are concretely mentioned methyl group, ethyl group, n-propyl group, isopropyl group, n-butyl group, isobutyl group, sec-butyl group (1-methylpropyl group), tert-butyl group, n-amyl group (n-pentyl group), sec-amyl group (1-methylbutyl group), isoamyl group (isopentyl group), neopentyl group, tert-amyl group (tert-pentyl group), 1-methylpentyl group, n-hexyl group, isohexyl group, n-heptyl group, isoheptyl group, n-octyl group, iso-octyl group, nonyl group, isononyl group, decyl group, undecyl group, dodecyl group and so on. Among them, when $R^2$ is the straight alkyl group, the carbon number of 1-4 is preferable, the carbon number of 1-3 is more preferable, and the carbon number of 1-2 is most preferable from a viewpoint of the effects such as easiness of synthesis, starting material cost and the like and the consideration on accumulation to human body. On the other hand, when $R^2$ is the branched alkyl group, from a viewpoint of balancedly developing the favorable vulcanization rate and the good adhesiveness and a viewpoint of maintaining a proper concentrating property, a branched alkyl group having a branching at α-site, i.e. a branched alkyl group branched at a carbon atom of α-site bonding to nitrogen atom and having a carbon number of 3-10, more preferably 3-6 is preferable, which includes concretely isopropyl group, sec-butyl group, 1-methylpentyl group and the like. By properly selecting the $R^1$ and $R^2$ can be effectively controlled the bulkiness of the substituent located in the vicinity of —N— to balancedly develop the favorable vulcanization rate and the good adhesiveness while considering the accumulation to a human body.

If $R^2$ of the formula (I) is H as in the conventional sulfenamide-based vulcanization accelerator, there is fear that the vulcanization rate is too fast but also there is a tendency that the good adhesiveness is not obtained. Also, when $R^2$ is a bulky group such as cyclohexyl group or a long-chain group being outside the above range as in the conventional sulfenamide-based vulcanization accelerator, the vulcanization rate conversely tends to be too late.

Particularly, when $R^1$ is tert-butyl group and n is 0, as an optimum branched alkyl group among $R^2$s having the above carbon number are more concretely mentioned isopropyl group and sec-butyl group from a viewpoint of balancedly developing the effect of holding the improvement of adhesiveness and the vulcanization rate equal to that of DCBS.

Moreover, when $R^1$ is tert-butyl group and n is 0, as $R^2$ having the above carbon number is particularly preferable the straight alkyl group than the branched alkyl group. As the optimum straight alkyl group are mentioned methyl group and ethyl group from a viewpoint of balancedly developing the improvement of adhesiveness and the holding of the vulcanization rate equal to that of DCBS and a viewpoint of considering the accumulation to a human body. If both of $R^1$ and $R^2$ are branched alkyl groups, the stability after the production tends to be deteriorated, while if each of $R^1$ and $R^2$ is tert-butyl group, the synthesis can not be conducted.

Moreover, when $R^1$ in the sulfenamide-based vulcanization accelerator of the formula (I) is a functional group (e.g. n-octadecyl group or the like) other than the branched alkyl group having a carbon number of 3-12 or a branched alkyl group having a carbon number of more than 12, or when $R^2$ is a functional group (e.g. n-octadecyl group or the like) other than the straight or branched alkyl group having a carbon number of 1-10 or a straight or branched alkyl group having a carbon number of more than 10, or further when n is not less than 2, the effects aiming at the invention can not be developed sufficiently, and there is a fear that the Mooney scorch time becomes slower outside the preferable range and the vulcanization time becomes longer beyond necessity, whereby the productivity and adhesiveness are deteriorated or the vulcanization performance as the accelerator or rubber performances are deteriorated.

In the formula (I), $R^3$-$R^6$ are independently a hydrogen atom, a straight alkyl group or alkoxy group having a carbon number of 1-4 or a branched alkyl group or alkoxy group having a carbon number of 3-4 and may be same or different. Particularly, $R^3$ and $R^5$ are preferable to be a straight alkyl group or alkoxy group having a carbon number of 1-4 or a branched alkyl group or alkoxy group having a carbon number of 3-4. Also, when each of $R^3$-$R^6$ is an alkyl group or alkoxy group having a carbon number of 1-4, the carbon number of 1 is preferable. It is preferable that all of $R^3$-$R^6$ are H. These preferable cases are desirable in a point that the synthesis of the compound is easy and the vulcanization rate becomes not slow. As a concrete example of $R^3$-$R^6$ in the formula (I) are mentioned methyl group, ethyl group, n-propyl group, isopropyl group, n-butyl group, isobutyl group, sec-butyl group, tert-butyl group, methoxy group, ethoxy group, n-propoxy group, isopropoxy group, n-butoxy group, isobutoxy group, sec-butoxy group, tert-butoxy group and so on.

Also, a log Pow value (distribution coefficient of 1-octanol/water) of the above sulfenamide-based vulcanization accelerator is preferable to become smaller in view of holding a proper concentrating property. Concretely, as the carbon number of $R^1$ and $R^2$ in the formula (I) becomes smaller, the log Pow value tends to be smaller. For example, when $R^1$ in the formula (I) used in the invention is t-butyl group and n is 0, it is desirable that $R^2$ in the formula (I) is a straight alkyl group having a carbon number of 1-4, more preferably 1-3, most preferable 1-2 from a viewpoint that the good adhesion performance is developed while maintaining the vulcanization rate equal to DCBS being the conventional sulfenamide-based vulcanization accelerator and the accumulation to a human body is considered.

Moreover, the log Pow value (distribution coefficient of 1-octanol/water) is generally a value obtained by one of simple measuring methods for evaluating a concentrating property of a chemical substance, which means a value obtained from a concentration ratio Pow of a chemical substance at two phases when the chemical substance is added to two solvent phases of 1-octanol and water to render into an equilibrium state. Pow is represented by the following equation, and a logarithm value of Pow is the log Pow value.

$$Pow=Co/Cw$$

Co: concentration of chemical substance in 1-octanol
Cw: concentration of chemical substance in water The log Pow value can be determined by measuring Pow according to JIS Z7260-117 (2006) using a high-performance liquid chromatography.

As a typical example of the sulfenamide-based vulcanization accelerator used in the invention are mentioned N-methyl-N-t-butylbenzothiazole-2-sulfenamide (BMBS), N-ethyl-N-t-butylbenzothiazol-2-sulfenamide (BEBS), N-n-propyl-N-t-butylbenzothiazole-2-sulfenamide, N-isopropyl-N-t-butylbenzothiazole-2-sulfenamide, N-n-butyl-N-t-butylbenzothiazole-2-sulfenamide (BBBS), N-isobutyl-N-t-butylbenzothiazole-2-sulfenamide, N-sec-butyl-N-t-butylbenzothiazole-2-sulfenamide, N-methyl-N-isoamylbenzothiazole-2-sulfenamide, N-ethyl-N-isoamylbenzothiazole-2-sulfenamide, N-n-propyl-N-isoamylbenzothiazole-2-sulfenamide, N-isopropyl-N-isoamylbenzothiazole-2-sulfenamide, N-n-butyl-N-isoamylbenzothiazole-2-sulfenamide, N-isobutyl-N-isoamylbenzothiazole-2-sulfenamide, N-sec-butyl-N-isoamylbenzothiazole-2-sulfenamide, N-methyl-N-tert-amylbenzothiazole-2-sulfenamide, N-ethyl-N-tert-amylbenzothiazole-2-sulfenamide, N-n-propyl-N-tert-amylbenzothiazole-2-sulfenamide, N-isopropyl-N-tert-amylbenzothiazole-2-sulfenamide, N-n-butyl-N-tert-amylbenzothiazole-2-sulfenamide, N-isobutyl-N-tert-amylbenzothiazole-2-sulfenamide, N-sec-butyl-N-tert-amylbenzothiazole-2-sulfenamide, N-methyl-N-tert-heptylbenzothiazole-2-sulfenamide, N-ethyl-N-tert-heptylbenzothiazole-2-sulfenamide, N-n-propyl-N-tert-heptylbenzothiazole-2-sulfenamide, N-isopropyl-N-tert-heptylbenzothiazole-2-sulfenamide, N-n-butyl-N-tert-heptylbenzothiazole-2-sulfenamide, N-isobutyl-N-tert-heptylbenzothiazole-2-sulfenamide, N-sec-butyl-N-tert-heptylbenzothiazole-2-sulfenamide; N-methyl-N-t-butyl-4-methylbenzothiazole-2-sulfenamide, N-methyl-N-t-butyl-4,6-dimethoxybenzothiazole-2-sulfenamide, N-ethyl-N-t-butyl-4-methylbenzothiazole-2-sulfenamide, N-ethyl-N-t-butyl-4,6-dimethoxybenzothiazole-2-sulfenamide, N-n-propyl-N-t-butyl-4-methylbenzothiazole-2-sulfenamide, N-n-propyl-N-t-butyl-4,6-dimethoxybenzothiazole-2-sulfenamide, N-isopropyl-N-t-butyl-4-methylbenzothiazole-2-sulfenamide, N-isopropyl-N-t-butyl-4,6-dimethoxybenzothiazole-2-sulfenamide, N-n-butyl-N-t-butyl-4-methylbenzothiazole-2-sulfenamide, N-n-butyl-N-t-butyl-4,6-dimethoxybenzothiazole-2-sulfenamide, N-isobutyl-N-t-butyl-4-methylbenzothiazole-2-sulfenamide, N-isobutyl-N-t-butyl-4,6-dimethoxybenzothiazole-2-sulfenamide, N-sec-butyl-N-t-butyl-4-methylbenzothiazole-2-sulfenamide, N-sec-butyl-N-t-butyl-4,6-dimethoxybenzothiazole-2-sulfenamide and so on. They may be used alone or in a combination of two or more.

Among them, N-methyl-N-t-butylbenzothiazole-2-sulfenamide (BMBS), N-ethyl-N-t-butylbenzothiazole-2-sulfenamide (BEBS), N-n-propyl-N-t-butylbemzothiazole-2-sulfenamide, N-isopropyl-N-t-butylbenzothiazole-2-sulfenamide, N-isobutyl-N-t-butylbenzothiazole-2-sulfenamide and N-sec-butyl-N-t-butylbenzothiazole-2-sulfenamide are preferable in view of the improvement of adhesiveness, and N-methyl-N-t-butylbenzothiazole-2-sulfenamide (BMBS), N-ethyl-N-t-butylbenzothiazole-2-sulfenamide (BEBS), N-isopropyl-N-t-butylbenzothiazole-2-sulfenamide and N-sec-butyl-N-t-butylbenzothiazole-2-sulfenamide are most preferable.

Particularly, N-methyl-N-t-butylbenzothiazole-2-sulfenamide (BMBS) and N-ethyl-N-t-butylbenzothiazole-2-sulfenamide (BEBS) are optimum in a point that they have a longest Mooney scorch time and an excellent adhesion performance.

These sulfenamide-based vulcanization accelerators may be used in a combination with a general-purpose vulcanization accelerator such as N-tert-butyl-2-benzothiazole sulfenamide (TBBS), N-cyclohexyl-2-benzothiazole sulfenamide (CBS), dibenzothiazolyl disulfide (MBTS) or the like.

The content of the sulfenamide-based vulcanization accelerator is 0.1-10 parts by mass, preferably 0.3-5 parts by mass, more preferably 0.5-2.5 parts by mass per 100 parts by mass of the rubber component. When the content of the vulcanization accelerator is less than 0.1 part by mass, there is a fear that sufficient vulcanization is not obtained, while when it exceeds 10 parts by mass, the blooming becomes a problem.

As a method of producing the sulfenamide-based vulcanization accelerator may be preferably mentioned the following method.

That is, N-chloroamine previously prepared by the reaction of the corresponding amine with sodium hypochlorite is reacted with bis(benzothiazole-2-yl)disulfide in a proper solvent in the presence of an amine and a base. When the amine is used as a base, neutralization is conducted to return to a free amine, and thereafter the resulting reaction mixture is subjected to a proper post-treatment such as filtration, washing with water, concentration, recrystallization or the like in accordance with the nature of the reaction mixture to obtain a target sulfenamide.

As the base used in this method are mentioned starting amine used excessively, a tertiary amine such as triethylamine or the like, an alkali hydroxide, an alkali carbonate, an alkali bicarbonate, an sodium alkoxide and so on. Particularly, it is desirable to use a method wherein the reaction is conducted by using the excessive starting amine as a base or using triethylamine as a tertiary amine and the resulting hydrochloride is neutralized with sodium hydroxide and an amine is recycled from a filtrate after the recovery of the target substance.

As the solvent used in this method is desirable an alcohol, and particularly methanol is desirable.

As to N-ethyl-N-t-butylbenzothiazole-2-sulfenamide (BEBS), for example, an aqueous solution of sodium hypochlorite is added dropwise to N-t-butylethylamine below 0° C. and stirred for 2 hours to dispense an oil layer. Then, bis(benzothiazole-2-yl)disulfide, N-t-butylethylamine and the above oil layer are suspended into methanol and stirred under reflux for 2 hours. After the cooling, the mixture is neutralized with sodium hydroxide, filtered, washed with water, concentrated under a reduced pressure and then recrystallized, whereby there can be obtained a target BEBS (white solid).

The bismaleimide derivative of the formula (II) used in the invention can more increase the elasticity of the resulting rubber composition by reacting the bismaleimide derivative itself under heating or forming a network structure through double bond of a polymer to increase the molecular weight of the polymer as a whole.

In the formula (II), A is a bivalent aromatic residue having a carbon number of 6-30. As A may be concretely mentioned groups represented by the following formulae, and so on.

[Chemical 6]

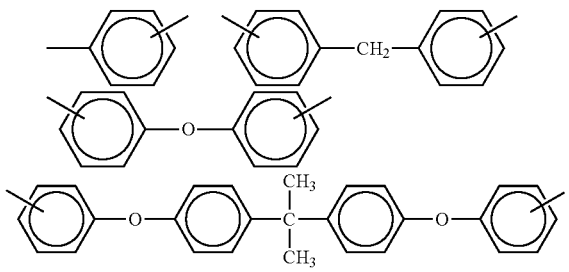

Moreover, one or more substituents such as a lower alkyl group having a carbon number of about 1-5 and the like may be introduced on each aromatic ring in the above bivalent aromatic residue.

In the formula, y and z are independently an integer of 0-3.

As a concrete example of the biamaleimide derivative represented by the formula (II) are mentioned N,N'-1,2-phenylene bismaleimide, N,N'-1,3-phenylene bismaleimide, N,N'-1,4-phenylene bismaleimide, N,N'-(4,4'-diphenylmethane)bismaleimide, N,N'-(4,4'-diphenylether)bismaleimide, 2,2-bis[4-(4-meleimidophenoxy)phenyl]propane, bis(3-ethyl-5-methyl-4-maleimidophenyl)methane and so on. These maleimide derivatives may be used alone or in a combination of two or more. Among them, N,N'-(4,4'-diphenylmethane)bismaleimide is particularly preferable.

The content of the bismaleimide derivative is 0.1-30 parts by mass, preferably 0.1-10 parts by mass, more preferably 0.5-5 parts by mass based on 100 parts by mass of the rubber component. When the content of the bismaleimide derivative is less than 0.1 part by mass, there is a fear that the effect by the compounding the bismaleimide derivative is not developed sufficiently, while when it exceeds 30 parts by mass, there is a possibility that the rubber properties such as fracture properties and the like are deteriorated.

Sulfur used in the invention serves as a vulcanizing agent, and the content thereof is 0.3-10 parts by mass, preferably 1.0-7.0 parts by mass, more preferably 3.0-7.0 parts by mass per 100 parts by mass of the rubber component. When the content of sulfur is less than 0.3 part by mass, there is a fear that sufficient vulcanization is not attained, while when it exceeds 10 parts by mass, there is a fear that the aging performance of rubber is deteriorated.

Further, the rubber composition is preferable to further contain a cobalt-based component made of cobalt element and/or a cobalt-containing compound in view of the improvement of initial adhesion performance. As the cobalt-based component are mentioned cobalt element but also a cobalt salt of an organic acid as a cobalt-containing compound, at least one of cobalt chloride, cobalt sulfate, cobalt nitrate, cobalt phosphate, cobalt chromate as a cobalt salt of an inorganic acid. Particularly, the cobalt salt of the organic acid is desirable in view of further improvement of initial adhesion performance. The cobalt element and cobalt-containing compounds may be used alone or in a combination of two or more.

As the cobalt salt of the organic acid may be concretely mentioned, for example, at least one of cobalt naphthenate, cobalt stearate, cobalt neodecanoate, cobalt rosinate, cobalt versatate, cobalt tallolate and so on. Also, the cobalt salt of the organic acid may be a composite salt formed by replacing a part of the organic acid with boric acid, and may include commercially available product "Manobond", made by OMG or the like concretely.

The content (in total) of the cobalt-based component is preferably 0.03-3 parts by mass, more preferably 0.03-1 part by mass as a cobalt quantity per 100 parts by mass of the rubber component.

When the cobalt content is less than 0.03 part by mass, the adhesiveness can not be further developed, while when it exceeds 3 parts by mass, the aging properties are largely deteriorated.

In the rubber composition according to the invention, additives usually used in rubber articles such as tire, conveyor belt and the like may be used within a range not obstructing the effects of the invention in addition to the aforementioned rubber component, vulcanization accelerator, bismaleimide derivative, sulfur and cobalt-based component.

For example, when using a reinforcing filler, the fracture resistance, wear resistance and the like can be more improved. Concretely, there is mentioned carbon black or white inorganic filling materials.

As the carbon black are mentioned channel black, furnace black, acetylene black, thermal black and the like depending on the production methods, all of which may be used. For example, SRF, GPF, FEF, HAF, ISAF, SAF and so on may be mentioned. However, carbon black having an iodine adsorption (IA) of not less than 60 mg/g and dibutyl phthalate absorption (DBP) of not less than 80 ml/100 g is preferable.

On the other hand, as a white inorganic filler are preferable silica and substances represented by the following general formula (Y):

$$mM_1 \cdot xSiO_y \cdot zH_2O \qquad (Y)$$

(in the formula (Y), $M_1$ is at least one selected from a metal selected from the group consisting of aluminum, magnesium, titanium and calcium, and an oxide or a hydroxide of these metal and hydrates thereof, and m, x, y and z are an integer of 1-5, an integer of 0-10, an integer of 2-5 and an integer of 0-10, respectively). Further, it may contain a metal such as potassium, sodium, iron, magnesium or the like, an element such as fluorine or the like, and $NH_4$— group or the like.

Concretely, there may be exemplified alumina monohydrate ($Al_2O_3 \cdot H_2O$), aluminum hydroxide [$Al(OH)_3$] such as gibbsite, bayerite or the like, magnesium hydroxide [$Mg(OH)_2$], magnesium oxide (MgO), talc ($3MgO \cdot 4SiO_2 \cdot H_2O$), attapulgite (5MgO.8SiO$_2$.9H$_2$O), titanium white (TiO$_2$), titanium black (TiO$_{2n-1}$), calcium oxide (CaO), calcium hydroxide [Ca(OH)$_2$], aluminum magnesium oxide (MgO.Al$_2$O$_3$), clay (Al$_2$O$_3$.2SiO$_2$), kaolin (Al$_2$O$_3$.2SiO$_2$.2H$_2$O), pyrophyllite (Al$_2$O$_3$.4SiO$_2$.H$_2$O), bentonite (Al$_2$O$_3$.4SiO$_2$.2H$_2$O), aluminum silicate (Al$_2$SiO$_5$, Al$_4$.3SiO$_4$.5H$_2$O, and so on), magnesium silicate (Mg$_2$SiO$_4$, MgSiO$_3$, and so on), calcium silicate (Ca$_2$SiO$_4$, and so on), aluminum calcium silicate (Al$_2$O$_3$.CaO.2SiO$_2$, and so on), magnesium calcium silicate (CaMgSiO$_4$), various zeolites, feldspar, mica, montmorillonite and so on. In the above formula, M$_1$ is preferable to be aluminum, and aluminas and clays are particularly preferable.

The aluminas are represented by the following general formula (Z) among the compounds of the above general formula (Y):

Al$_2$O$_3$.$n$H$_2$O (wherein $n$ is 0-3)  (Z)

The clays include clay (Al$_2$O$_3$.2SiO$_2$), kaolin (Al$_2$O$_3$.2SiO$_2$.2H$_2$O), pyrophyllite (Al$_2$O$_3$.4SiO$_2$.H$_2$O), bentonite (Al$_2$O$_3$.4SiO$_2$.2H$_2$O), montmorillonite and the like.

Among these white inorganic fillers, silica and aluminum hydroxide are preferable, and silica is particularly preferable. Silica can be properly selected from ones conventionally and commonly used for rubber reinforcement, for example, wet-type silica (silicic hydrate), dry-type silica (silicic anhydride), various silicates and the like, and among them silica synthesized by precipitation process (wet-type silica) is preferable.

The reinforcing filler can be compounded in an amount of 10-120 parts by mass, preferably 20-100 parts by mass per 100 parts by mass of the rubber component.

Furthermore, when the white inorganic filler such as silica or the like is used as the reinforcing filler, a coupling agent may be compounded, if desired. The coupling agent is not particularly limited, and may be used by arbitrarily selecting from the conventionally known various coupling agents, but a silane-based coupling agent is particularly preferable. As an example of the silane-based coupling agent are mentioned bis(3-triethoxysilylpropyl)tetrasulfide, bis(3-trimethoxysilylpropyl)tetrasulfide, bis(3-methyldimethoxysilylpropyl) tetrasulfide, bis(3-triethoxysilylethyl)tetrasulfide, bis(3-triethoxysilylpropyl)disulfide, bis(3-trimethoxysilylpropyl) disulfide, bis(3-triethoxysilylpropyl)trisulfide, 3-mercaptopropyltrimethoxy silane, 3-mercaptopropyltriethoxy silane, vinyltriethoxy silane, vinyltrimethoxy silane, 3-aminopropyltriethoxy silane, 3-aminopropyltrimethoxy silane, 3-mercaptopropylmethyldimethoxy silane, γ-glycidoxypropyltrimethoxy silane, γ-glycidoxypropylmethyldiethoxy silane, 3-trimethoxysiylylpropyl-N,N-dimethylcarbamoyl tetrasulfide, 3-trimethoxysilylpropylbenzothiazolyl tetrasulfide, 3-trimethoxysilylpropylmethacryloyl monosulfide and so on.

The above coupling agents may be used alone or in a combination of two or more. The amount compounded is 1-20 mass %, preferably 5-20 mass % per the white inorganic filler considering the compounding effect and economic reasons.

As a compounding agent other than the above are mentioned, for example, a softening agent, an antioxidant and the like. They may be properly compounded in accordance with the applications.

The rubber composition according to the invention can be produced, for example, by milling the above components in a Banbury mixer, kneader or the like. Also; when a tire for passenger car, truck, bus, motorcycle or the like is produced by using the rubber composition according to the invention, a bead filler member or a side-reinforcing rubber for a run-flat tire may be prepared, or it can be carried out by laminating these members with the other member on a building drum to prepare a green tire, placing the green tire in a tire mold and then vulcanizing while applying a pressure from an inside. Moreover, nitrogen or an inert gas may be filled into an interior of the tire in addition to air. Further, the rubber composition according to the invention may be preferably used in rubber articles having a larger thickness such as tire tread, hose, belt conveyor and the like, rubber articles by direct vulcanization adhesion between rubber and metal, and so on. Particularly, it is optimum in the base rubber, belt rubber or the like in the tread portion of the tire.

EXAMPLES

The invention is concretely described with reference to the following examples below, but the invention is not limited to these examples.

Moreover, the log Pow value of each of the sulfenamide-based vulcanization accelerators is determined by measuring Pow according to JIS Z7260-117 (2006) with a high performance liquid chromatography as previously mentioned.

Production Example 1

Synthesis of
N-methyl-N-t-butylbenzothiazole-2-sulfenamide
(Vulcanization Accelerator 1)

To 14.1 g of N-t-butylmethylamine (0.162 mol) is added 148 g of an aqueous solution of 12% sodium hypochlorite dropwise below 0° C., which is stirred for 2 hours to batch off an oil layer. The oil layer, 39.8 g (0.120 mol) of bis(benzothiazole-2-yl)disulfide and 24.3 g (0.240 mol) of N-t-butylmethylamine are suspended in 120 ml of methanol, which are stirred under reflux for 2 hours. After the cooling, the reaction mixture is neutralized with 6.6 g (0.166 mol) of sodium hydroxide, filtered, washed with water, concentrated under a reduced pressure and then recrystallized to obtain 46.8 g (yield: 82%) of a target BMBS as a white solid (melting point of 56-58° C., log Pow value of 4.5).

$^1$H-NMR (400 MHz, CDCl$_3$) δ=1.32 (9H, s, CH$_3$ (t-butyl)), 3.02 (3H, s, CH$_3$ (methyl)), 7.24 (1H, m), 7.38 (1H, m), 7.77 (1H, m), 7.79 (1H, m)

$^{13}$C-NMR (100 MHz, CDCl$_3$) δ=27.3, 41.9, 59.2, 120.9, 121.4, 123.3, 125.7, 135.0, 155.5, 180.8,

Mass analysis (EI, 70 eV): m/z; 252 (M$^+$), 237 (M$^+$-CH$_3$), 223 (M$^+$-C$_2$H$_6$), 195 (M$^+$-C$_4$H$_9$), 167 (M$^+$-C$_5$H$_{12}$N), 86 (M$^+$-C$_7$H$_4$NS$_2$)

Production Example 2

Synthesis of
N-ethyl-N-t-butylbenzothiazole-2-sulfenamide
(BEBS, Vulcanization Accelerator 2)

The same procedure as in Production Example 1 is carried out except that 16.4 g (0.162 mol) of N-t-butylethylamine is used instead of N-t-butylmethylamine to obtain 41.9 g (yield: 66%) of BEBS as a white solid (melting point of 60-61° C., log Pow value of 4.9).

The spectral data of the resulting BEBS are shown as follows.

$^1$H-NMR (400 MHz, CDCl$_3$) δ=1.29 (t, 3H, J=7.1 Hz, CH$_3$ (methyl)), 1.34 (s, 9H, CH$_3$ (t-butyl)), 2.9-3.4 (br-d, CH$_2$), 7.23 (1H, m), 7.37 (1H, m), 7.75 (1H, m), 7.78 (1H, m)

$^{13}$C-NMR (100 MHz, CDCl$_3$) δ=15.12, 28.06, 47.08, 60.41, 120.70, 121.26, 123.23, 125.64, 134.75, 154.93, 182.63

Mass analysis (EI, 70 eV): m/z; 251 (M$^+$-CH$_4$), 167 (M$^+$-C$_6$H$_{14}$N), 100 (M$^+$-C$_7$H$_5$NS$_2$): IR (KBr, cm$^{-1}$): 3061, 2975, 2932, 2868, 1461, 1429, 1393, 1366, 1352, 1309, 1273, 1238, 1198, 1103, 1022, 1011, 936, 895, 756, 727

Production Example 3

Synthesis of
N-n-propyl-N-t-butylbenzothiazole-2-sulfenamide
(Vulcanization Accelerator 3)

The same manner as in Production Example 1 is carried out except that 18.7 g (0.162 mol) of N-n-propyl-t-butylamine is used instead of N-t-butylmethyl amine to obtain N-n-propyl-N-t-butylbenzothiazole-2-sulfenamide as a white solid (melting point of 50-52° C., log Pow value of 5.3).

$^1$H-NMR (400 MHz, CDCl$_3$) δ=0.92 (t, J=7.3 Hz, 3H), 1.34 (s, 9H), 1.75 (br, 2H), 3.03 (brd, 2H), 7.24 (t, J=7.0 Hz, 1H), 7.38 (t, J=7.0 Hz, 1H), 7.77 (d, J=7.5 Hz, 1H), 7.79 (d, J=7.5 Hz, 1H)

$^{13}$C-NMR (100 MHz, CDCl$_3$) δ=11.7, 23.0, 28.1, 55.3, 60.4, 120.7, 121.3, 123.3, 125.7, 134.7, 154.8, 181.3

Production Example 4

Synthesis of
N-i-propyl-N-t-butylbenzothiazole-2-sulfenamide
(Vulcanization Accelerator 4)

The same manner as in Production Example 1 is carried out except that 18.7 g (0.162 mol) of N-i-propyl-t-butylamine is used instead of N-t-butylmethylamine to obtain N-i-propyl-N-t-butylbenzothiazole-2-sulfenamide as a white solid (melting point of 68-70° C., log Pow value of 5.1).

$^1$H-NMR (400 MHz, CDCl$_3$) δ=1.20-1.25 (dd, (1.22 ppm: J=6.4 Hz, 1.23 ppm: J=6.4 Hz) 6H), 1.37 (s, 9H), 3.78 (m, J=6.3 Hz, 1H), 7.23 (t, J=7.0 Hz, 1H), 7.38 (t, J=7.0 Hz, 1H), 7.77 (d, J=7.5 Hz, 1H), 7.79 (d, J=7.5 Hz, 1H)

$^{13}$C-NMR (100 MHz, CDCl$_3$) δ=22.3, 23.9, 29.1, 50.6, 61.4, 120.6, 121.2, 123.2, 125.6, 134.5, 154.5, 183.3

Production Example 5

Synthesis of
N,N-di-i-propylbenzothiazole-2-sulfenamide
(Vulcanization Accelerator 5)

The same manner as in Production Example 1 is carried out except that 16.4 g (0.162 mol) of N-di-i-propylamine is used instead of N-t-butylmethylamine to obtain N,N-di-i-propyl-benzothiazole-2-sulfenamide as a white solid (melting point of 57-59° C.).

$^1$H-NMR (400 MHz, CDCl$_3$) δ=1.26 (d, J=6.5 Hz, 12H), 3.49 (dq, J=6.5 Hz, 2H), 7.24 (t, J=7.0 Hz, 1H), 7.37 (t, J=7.0 Hz, 1H), 7.75 (d, J=8.6 Hz, 1H), 7.79 (d, J=8.6 Hz, 1H)

$^{13}$C-NMR (100 MHz, CDCl$_3$) δ=21.7, 22.5, 55.7, 120.8, 121.3, 123.4, 125.7, 134.7, 155.1, 182.2

Mass analysis (EI, 70 eV): m/z; 266 (M$^+$), 251 (M$^+$-15), 218 (M$^+$-48), 209 (M$^+$-57), 182 (M$^+$-84), 167 (M$^+$-99), 148 (M$^+$-118), 100 (M$^+$-166: base)

Production Example 6

Synthesis of
N-n-butyl-N-t-butylbenzothiazole-2-sulfenamide
(Vulcanization Accelerator 6)

The same manner as in Production Example 1 is carried out except that 20.9 g (0.162 mol) of N-t-butyl-n-butylamine is used instead of N-t-butylmethylamine to obtain 42.4 g (yield: 60%) of BBBS as a white solid (melting point of 55-56° C., log Pow value of 5.8).

$^1$H-NMR (400 MHz, CDCl$_3$) δ=0.89 (3H, t, J=7.32 Hz, CH$_3$ (n-Bu)), 1.2-1.4 (s+m, 11H, CH$_3$ (t-butyl)+CH$_2$ (n-butyl)), 1.70 (br, s, 2H, CH$_2$), 2.9-3.2 (br, d, 2H, N—CH$_2$), 7.23 (1H, m), 7.37 (1H, m), 7.75 (1H, m), 7.78 (1H, m)

$^{13}$C-NMR (100 MHz, CDCl$_3$) δ=14.0, 20.4, 27.9, 31.8, 53.0, 60.3, 120.6, 121.1, 123.1, 125.5, 134.6, 154.8, 181.2

Mass analysis (EI, 70 eV): m/z; 294 (M$^+$), 279 (M$^+$-CH$_3$), 237 (M$^+$-C$_4$H$_9$), 167 (M$^+$-C$_8$H$_{18}$N), 128 (M$^+$-C$_7$H$_4$NS$_2$): IR (neat): 1707 cm$^{-1}$, 3302 cm$^{-1}$ Examples 1-6

An unvulcanized rubber composition is prepared by milling and mixing a rubber component, a vulcanization accelerator obtained in the above production example, a bismaleimide derivative, sulfur and other compounding agents according to a compounding recipe shown in Table 1 in a Banbury mixer of 2200 ml, and then the Mooney viscosity and Mooney scorch time are measured by the following method and the test for dynamic viscoelasticity is conducted and evaluated by the following method. The results are shown in Table 1.

Comparative Example 1

A rubber composition is prepared in the same manner as in Example 1 except that the conventional vulcanization accelerator (DCBS) is used and the bismaleimide derivative is not compounded, and then evaluated. The results are shown in Table 1.

Comparative Example 2

A rubber composition is prepared in the same manner as in Example 1 except that the conventional vulcanization accelerator (DCBS) is used, and then evaluated. The results are shown in Table 1.

Examples 7-10

Comparative Examples 3-4

A rubber composition is prepared and evaluated according to a compounding recipe shown in Table 2 by properly compounding natural rubber and BR (butadiene rubber) or SBR (styrene-butadiene rubber) as a rubber component. The results are shown in Table 2.

Examples 11-14

Comparative Examples 5-6

A rubber composition is prepared and evaluated according to a compounding recipe shown in Table 3 by properly compounding natural rubber and BR (butadiene rubber) or SBR (styrene-butadiene rubber) as a rubber component and further compounding a cobalt-based component. The results are shown in Table 3.

<Evaluation Method of Mooney Viscosity and Mooney Scorch Time>

It is carried out according to JIS K6300-1:2001.

Moreover, the evaluation is represented by an index on the basis that the value of Comparative Example 1 is 100. The smaller the index value of the Mooney viscosity, the better the workability in the milling, while the larger the index value of the Mooney scorch time, the better the workability in the milling.

<Evaluation Method on Test for Dynamic Viscoelasticity>

With respect to the resulting rubber composition are measured E' (dynamic storage modulus) and tan δ (loss tangent) at a frequency of 52 Hz, a measuring temperature of 30° C. and a strain of 1% using a spectrometer (testing machine for measuring dynamic viscoelasticity) made by Toyo Seiki Co., Ltd., which are represented by an index on the basis that each value of the rubber composition of Comparative Example 1 is 100. The larger the index value on E', the higher the modulus of elasticity, and the smaller the index value on tan δ, the lower the loss (the lower the heat-buildup).

<Evaluation Method on Tensile Test>

A sample of JIS No. 3 dumbbell form is prepared from the resulting rubber composition, and then the tensile test is conducted at 25° C. according to JIS K6251:2004 to measure elongation at break (Eb), tensile strength at break (Tb) and tensile stress at 50% elongation (M50), which are represented by an index on the basis that each value of the rubber composition of Comparative Example 1 is 100. The larger the index value, the better the fracture resistance.

<Heat-Resistant Adhesiveness>

Three steel cords (outer diameter 0.5 mm×length 300 mm) plated with a brass (Cu: 63 mass %, Zn: 37 mass %) are aligned in parallel at an interval of 10 mm and coated with each of the rubber compositions from both up and down sides, which is vulcanized at 160° C. for 20 minutes to prepare a sample.

As to the heat-resistance adhesiveness of each of the resulting samples, the sample is placed in a gear oven of 100° C. for 15 days or 30 days according to ASTM-D-2229 and thereafter the steel cord is pulled out therefrom to visually observe a rubber-coated state, which is represented by 0-100% as an indication of heat-resistant adhesiveness. The larger the numerical value, the better the heat-resistant adhesiveness.

TABLE 1

|  | Example 1 | Example 2 | Example 3 | Example 4 | Example 5 | Example 6 | Comparative Example 1 | Comparative Example 2 |
|---|---|---|---|---|---|---|---|---|
| Natural rubber | 100 | 100 | 100 | 100 | 100 | 100 | 100 | 100 |
| Carbon black of HAF grade *1 | 50 | 50 | 50 | 50 | 50 | 50 | 50 | 50 |
| Zinc oxide | 5 | 5 | 5 | 5 | 5 | 5 | 5 | 5 |
| Antioxidant *2 | 1 | 1 | 1 | 1 | 1 | 1 | 1 | 1 |
| Vulcanization accelerator A *3 |  |  |  |  |  |  | 1 | 1 |
| Sulfur | 5 | 5 | 5 | 5 | 5 | 5 | 5 | 5 |
| Vulcanization accelerator 1 | 1 |  |  |  |  |  |  |  |
| Vulcanization accelerator 2 |  | 1 |  |  |  |  |  | 1 |
| Vulcanization accelerator 3 |  |  | 1 |  |  |  |  |  |
| Vulcanization accelerator 4 |  |  |  | 1 |  |  |  |  |
| Vulcanization accelerator 5 |  |  |  |  | 1 |  |  |  |
| Vulcanization accelerator 6 |  |  |  |  |  | 1 |  |  |
| Bismaleimide derivative *9 | 2 | 2 | 2 | 2 | 2 | 2 |  | 2 |
| Evaluation |  |  |  |  |  |  |  |  |
| Mooney viscosity ($ML_{1+4}$) | 98 | 99 | 100 | 100 | 99 | 100 | 100 | 102 |
| Mooney scorch time ($t_s$) | 107 | 112 | 110 | 109 | 108 | 106 | 100 | 105 |
| Test results for dynamic viscoelasticity Eb | 105 | 107 | 106 | 105 | 104 | 103 | 100 | 103 |
| tan δ | 99 | 97 | 98 | 99 | 100 | 100 | 100 | 99 |

The unit of the numerical value in each component of the rubber composition is part by mass.

TABLE 2

|  | Example 7 | Example 8 | Example 9 | Example 10 | Comparative Example 3 | Comparative Example 4 |
|---|---|---|---|---|---|---|
| Natural rubber | 100 | 100 | 90 | 90 | 90 | 90 |
| Butadiene rubber *7 |  |  | 10 |  | 10 | 10 |
| Styrene-butadiene rubber *8 |  |  |  | 10 |  |  |
| Carbon black of HAF grade *1 | 60 | 60 | 60 | 60 | 60 | 60 |
| Zinc oxide | 8 | 8 | 8 | 8 | 8 | 8 |
| Antioxidant *2 | 2 | 2 | 2 | 2 | 2 | 2 |
| Vulcanization accelerator A *3 |  |  |  |  |  |  |
| Vulcanization accelerator B *4 | 0.2 |  |  |  |  |  |
| Vulcanization accelerator C *5 |  | 0.2 |  |  |  |  |
| Sulfur | 5 | 5 | 5 | 5 | 5 | 5 |
| Vulcanization accelerator 1 |  |  |  |  |  |  |

TABLE 2-continued

|  | Example 7 | Example 8 | Example 9 | Example 10 | Comparative Example 3 | Comparative Example 4 |
|---|---|---|---|---|---|---|
| Vulcanization accelerator 2 | 0.8 | 0.8 | 1 | 1 |  |  |
| Vulcanization accelerator 3 |  |  |  |  |  |  |
| Vulcanization accelerator 4 |  |  |  |  |  |  |
| Vulcanization accelerator 5 |  |  |  |  |  |  |
| Vulcanization accelerator 6 |  |  |  |  |  |  |
| Bismaleimide derivative *9 | 2 | 2 | 2 | 2 | 2 | 2 |
| Evaluation | | | | | | |
| Mooney viscosity ($ML_{1+4}$) | 100 | 98 | 99 | 98 | 100 | 99 |
| Mooney scorch time ($t_s$) | 105 | 107 | 112 | 115 | 105 | 107 |
| Tensile test results  Eb | 100 | 100 | 101 | 102 | 101 | 102 |
| Tb | 101 | 102 | 100 | 103 | 99 | 105 |
| M50 | 100 | 105 | 100 | 101 | 98 | 101 |

The unit of the numerical value in each component of the rubber composition is part by mass.

TABLE 3

|  | Example 11 | Example 12 | Example 13 | Example 14 | Comparative Example 5 | Comparative Example 6 |
|---|---|---|---|---|---|---|
| Natural rubber | 100 | 100 | 90 | 90 | 90 | 90 |
| Butadiene rubber *7 |  |  | 10 |  | 10 |  |
| Styrene-butadiene rubber *8 |  |  |  | 10 |  | 10 |
| Carbon black of HAF grade *1 | 60 | 60 | 60 | 60 | 60 | 60 |
| Zinc oxide | 8 | 8 | 8 | 8 | 8 | 8 |
| Antioxidant *2 | 2 | 2 | 2 | 2 | 2 | 2 |
| Vulcanization accelerator A *3 |  |  |  |  |  | 1 |
| Vulcanization accelerator B *4 |  | 0.2 |  |  | 1 |  |
| Sulfur | 5 | 5 | 5 | 5 | 5 | 5 |
| Vulcanization accelerator 1 |  |  |  |  |  |  |
| Vulcanization accelerator 2 | 1 | 0.8 | 1 | 1 |  |  |
| Vulcanization accelerator 3 |  |  |  |  |  |  |
| Vulcanization accelerator 4 |  |  |  |  |  |  |
| Vulcanization accelerator 5 |  |  |  |  |  |  |
| Vulcanization accelerator 6 |  |  |  |  |  |  |
| Bismaleimide derivative *9 | 2 | 2 | 2 | 2 | 2 | 2 |
| Aliphatic acid salt of cobalt *6 | 1 | 1 | 1 | 1 | 1 | 1 |
| Evaluation | | | | | | |
| Mooney viscosity ($ML_{1+4}$) | 100 | 101 | 100 | 100 | 99 | 99 |
| Moonet scorch time ($t_s$) | 110 | 108 | 111 | 110 | 90 | 100 |
| Tensile test results  Eb | 100 | 100 | 100 | 99 | 98 | 99 |
| Tb | 101 | 102 | 97 | 96 | 99 | 98 |
| M50 | 100 | 101 | 99 | 99 | 100 | 99 |
| Heat-resistant adhesiveness (%)  deterioration after 15 days | 90 | 85 | 85 | 90 | 60 | 70 |
| deterioration after 30 days | 60 | 60 | 55 | 55 | 20 | 40 |

The unit of the numerical value in each component of the rubber composition is part by mass.
*1: trade name: Seast 300, made by Tokai Carbon Co., Ltd. nitrogen adsorption specific surface area 84 $m^2/g$, DBP absorption 75 ml/100 g
*2: N-phenyl-N'-1,3-dimethylbutyl-p-phenylene diamine (Nocrac 6C, made by OUCHI SHINKO CHEMICAL INDUSTRIAL Co., Ltd.)
*3: N,N'-dicyclohexyl-2-benzothiazylsulfenamide (Nocceler DZ, made by OUCHI SHINKO CHEMICAL INDUSTRIAL Co., Ltd.)
*4: N-cyclohexyl-2-benzothiazylsulfenamide (Nocceler CZ, made by OUCHI SHINKO CHEMICAL INDUSTRIAL Co., Ltd.)
*5: N-t-butylbenzothiazole-2-sulfenamide (Nocceler NS, made by OUCHI SHINKO CHEMICAL INDUSTRIAL Co., Ltd.)
*6: trade name: MANOBOND C22.5, made by OMG Co., Ltd. cobalt content: 22.5 mass %
*7: BR01
*8: SBR #1778
*9: N,N'-(4,4'-diphenylmethane) bismaleimide (BMI-S, made by Mitsui Chemicals, Inc.

As seen from the results of Tables 1-3, Examples 1-6 comprising the above specified vulcanization accelerator, bismaleimide derivative and sulfur develop the high elasticity and low heat-buildup while holding the good workability as compared with Comparative Example 1 containing the conventional vulcanization accelerator (DCBS) and sulfur but containing no bismaleimide derivative.

Also, it has been understood that although Examples 1-6 and Comparative Example 2 contain the same bismaleimide derivative in the same amount, respectively, Examples 1-6 show a more favorable Mooney scorch time while effectively suppressing the rise of Mooney viscosity as compared with Comparative Example 2 using the conventional vulcanization accelerator (DCBS). Also, it has been understood that the effect of increasing the elasticity and decreasing the heat-buildup is substantially equal to or more than that of Comparative Example 2.

In addition, as seen from the results of Tables 2-3, Examples 7-14 effectively prevent the deterioration of fracture resistance. Particularly, Examples 11-14 compounded with the cobalt-based component are excellent in the heat-resistance adhesiveness while maintaining the above good characteristics as compared with Examples 7-10.

Therefore, the rubber composition according to the invention comprises the specified vulcanization accelerator having a retarding effect equal to or more than that of DCBS and further the bismaleimide derivative and sulfur, so that the workability is excellent but also the elasticity is high and the good low heat-buildup can be attained. Also, it is possible to more improve the adhesiveness by compounding the cobalt-based component.

The invention claimed is:

1. A rubber composition comprising a rubber component, a sulfenamide-based vulcanization accelerator represented by a formula (I), a bismaleimide derivative represented by a formula (II) and sulfur:

[Chemical 1]

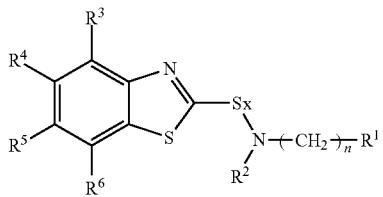

(I)

(in the formula (I), $R^1$ is a tert-butyl group, $R^2$ is a methyl group, ethyl group or n-propyl group, each of $R^3$-$R^6$ is a hydrogen atom, n is 0, and x is 1 or 2);

[Chemical 2]

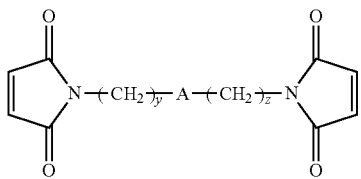

(II)

(In the formula (II), A is bivalent aromatic residue having a carbon number of 6-30 and y and z are independently an integer of 0-3).

2. A rubber composition according to claim 1, wherein the sulfenamide-based vulcanization accelerator is included in an amount of 0.1-10 parts by mass based on 100 parts by mass of the rubber component.

3. A rubber composition according to claim 1, wherein the bismaleimide derivative is included in an amount of 0.1-30 parts by mass based on 100 parts by mass of the rubber component.

4. A rubber composition according to claim 1, wherein sulfur is included in an amount of 0.3-10 parts by mass based on 100 parts by mass of the rubber component.

5. A rubber composition according to claim 1, wherein in the formula (I), $R^1$ is tert-butyl group, $R^2$ is ethyl group, each of $R^3$-$R^6$ is a hydrogen atom and n is 0.

6. A rubber composition according to claim 1, wherein the rubber composition further contains a cobalt-based component made of cobalt element and/or a cobalt-containing compound.

7. A rubber composition according to claim 6, wherein a content of the cobalt-based component is 0.03-3 parts by mass as a cobalt quantity per 100 parts by mass of the rubber component.

8. A rubber composition according to claim 6, wherein the cobalt-containing compound is a cobalt salt of an organic acid.

9. A rubber composition according to claim 1, wherein the rubber component comprises at least one of natural rubber and polyisoprene rubber.

10. A rubber composition according to claim 9, wherein not less than 50 mass % of natural rubber is included in 100 mass % of the rubber component.

* * * * *